United States Patent
Van Etten

[15] 3,685,052
[45] Aug. 15, 1972

[54] METHOD OF IMPROVING DYNAMIC PERFORMANCE OF A TRACKING LOOP FOR USE IN A MOBILE RECEIVER

[72] Inventor: James P. Van Etten, Nutley, N.J.

[73] Assignee: International Telephone and Telegraph Corporation, Nutley, N.J.

[22] Filed: June 25, 1970

[21] Appl. No.: 49,686

[52] U.S. Cl..................................343/103, 325/476
[51] Int. Cl...............................................G01s 1/24
[58] Field of Search .....................343/103; 325/476

[56] References Cited

UNITED STATES PATENTS 3,378,847  4/1968  Grover et al...............343/103

*Primary Examiner*—Benjamin A. Borchelt
*Assistant Examiner*—Richard E. Berger
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardt, Jr.

[57] ABSTRACT

This is a method and apparatus for improving the dynamic performance of a tracking loop for use in a pulse navigation mobile radio receiver. The receiver receives a signal having a contaminated and an uncontaminated portion. The uncontaminated portion is sampled to establish a stable reference point for determining the navigation position, and the contaminated portion is sampled at a point in time with respect to the stable reference point. The sampled contaminated portion is then used to correct the navigation position error due to dynamic shifts in the location of the receiver.

4 Claims, 9 Drawing Figures

SINGLE LORAN C PULSE

25 μsec

INVENTOR
JAMES P. VAN ETTEN
BY Stephen A. Young
ATTORNEY

INVENTOR
JAMES P. VAN ETTEN
BY Stephen A. Young
ATTORNEY

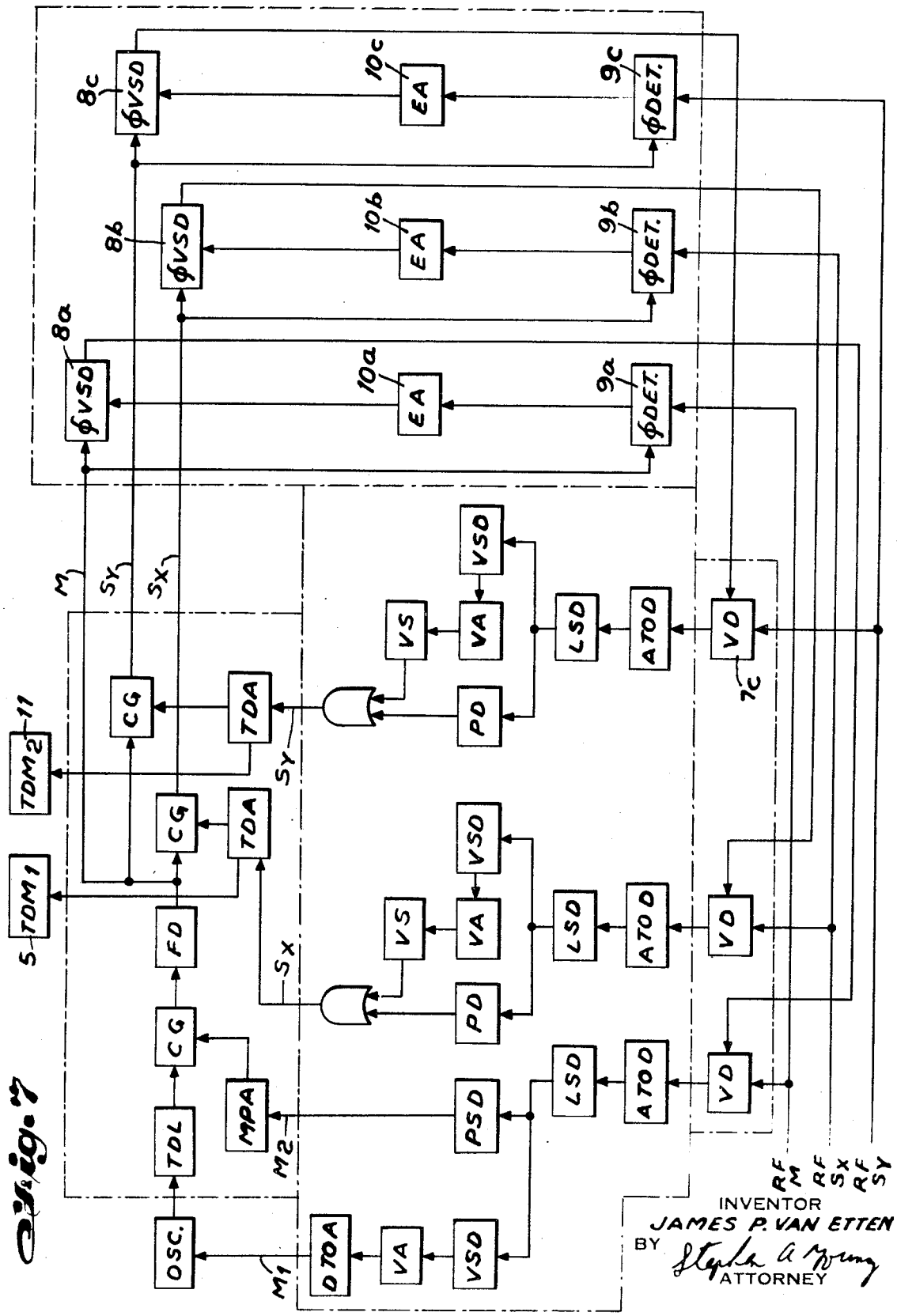

METHOD OF IMPROVING DYNAMIC PERFORMANCE OF A TRACKING LOOP FOR USE IN A MOBILE RECEIVER

BACKGROUND OF THE INVENTION

This invention is related to pulse navigation systems, and particularly to the improvement in the dynamic performance of a tracking loop for use in a pulse navigation radio receiver.

The tracking loop can be utilized within any pulsing and/or hyperbolic navigation system. However, in order to simplify the description of this invention, the discussion will be limited to Loran C type systems.

Loran is a hyperbolic line of position system by which a receiver can be located at the intersection of two hyperbolas. This is accomplished by measuring the difference in arrival times between two pairs of pulses emitted from three fixed transmitting sites. The transmitting stations are designated as a Master, Slave X, and Slave Y. As shown in FIG. 1, hyperbola A being determined by the X minus M pair, hyperbola B by the Y minus M pair. A receiver R receiving signals from a Master and two slave transmitters can get an exact position fix determined by the point of intersection R of the two hyperbolas.

Each station transmits precisely timed pulse RF signals. A pulse transmitted by the Master is received by Slave X which will seek to synchronize itself to the Master and then transmit its own pulse at a fixed time later. The Slave Y, also synchronized to the Master, will transmit a fixed time after it receives the Slave X signal, to avoid ambiguities.

Loran C pulses are transmitted on a 100 KC/S carrier in groups of 8 pulses, and with a group repetition rate ranging from 10 groups per second to 25 groups per second. The pulses in a group are spaced 1,000 microseconds apart. A single pulse is illustrated in FIG. 2. Further description and operation of the Loran system can be found in Jansky and Bailey, Inc. "The Loran C System Of Navigation," Report to U.S. Coast Guard, February 1962; J.A. Pierce, A.A. McKenzie and R.H. Woodward "LORAN," MIT Radiation Laboratories, Series, Volume 4, 1948 and R.A. Reilly, "Microminiature Loran C Receiver/Indicator" IEEE Transactions on AeroSpace and Electronic Systems, Volume AES-2, No.-1, Pages 74 to 88, Jan., 1966.

A particular problem associated with prior Loran C systems was that it could only be successfully applied to ships and slow moving aircraft. It has been found that in applying a system having a Tracking Loop, as shown in FIG. 3a, to high performance aircraft experiencing large dynamic shifts in the location of the Receiver, overall system performance severely deteriorates, resulting in large position errors. An inertial system which introduced correctional signals into the tracking loop does provide an improvement in the dynamic performance of the Tracking Loop. However, inertial systems are expensive and cannot in any event be utilized in small aircraft due to their size.

A reason for the inability of the Tracking Loop to respond to dynamic shifts in the location of the receiver, is that the information extracted from the received signal is limited because the received RF signals are generally sampled approximately 25 microseconds after the start of transmission of each signal pulse, wherein the amplitude of the transmitted signal is limited to 50 percent of its potential peak value. Sampling approximately 25 microseconds after start of received signal is generally done to insure that the sampled signal will be uncontaminated. Contamination results somewhere after approximately 30 microseconds from the start of each received signal pulse due to the reception of delayed transmitted signals that are reflected off the ionosphere, whereby that portion of the signal received approximately after 30 microseconds is considered contaminated with a "skywave" reflection. Since the distance of travel of a signal from the transmitter to receiver varies due to changes in height of the ionosphere, from night to day, and for other reasons, accurate reliance upon a signal so contaminated by a skywave reflection, cannot be made for determining position of a mobile receiver. However, if it were possible to sample the signal at or near a 100 percent peak value, the signal to noise ratio could be made at least four times greater than at the sampling point corresponding to 25 microseconds after start of received signal, the tracking loop bandwidth can be made $(4)^2$ or 16 times greater, and the errors due to vehicle acceleration can be reduced by a factor of $(16)^2$ or 256 times.

SUMMARY OF THE INVENTION

It is an object of this invention to improve the dynamic performance of the Tracking Loop in a radio navigation receiver without degrading navigation position accuracy of the receiver.

According to a broad aspect of this invention, the above object can be accomplished by sampling an uncontaminated portion of an RF signal to establish a stable reference point for a determined navigation position, then sampling the contaminated portion of said signal at a point in time with respect to said stable reference point, and utilizing said sampled contaminated portion to correct for the navigation position error due to dynamic shifts in the location of said receiver.

A feature of this invention provides that the contaminated portion is sampled at or near the peak of the received signal, so as to increase the signal to noise ratio of that portion of the signal used for correcting the error in the navigation position due to dynamic shifts in the location of said receiver.

Another aspect of this invention provides for a Tracking Loop having improved dynamic performance for use in a pulse navigation mobile radio receiver including means for sampling an RF signal, said signal having a contaminated and uncontaminated portion, a Type II servo coupled to said sampled signal, an oscillator coupled to said servo, a timing circuit coupled to said oscillator and said servo comprising a velocity tracking loop coupled to said timing circuit and said RF signal for delaying a sampling pulse to said sampling means, whereby the contaminated portion of said signal is sampled and utilized to correct for navigation position errors due to dynamic shift in the location of said receiver.

BRIEF DESCRIPTION OF THE DRAWINGS

FIG. 4, is a more detailed block diagram description of FIG. 3a;

FIG. 7, shows a more detailed Tracking Loop according to the invention which includes the circuit blocks for processing signals received from the Master, Slave X and Slave Y transmitters.

DESCRIPTION OF THE PREFERRED EMBODIMENTS

Figure 2:
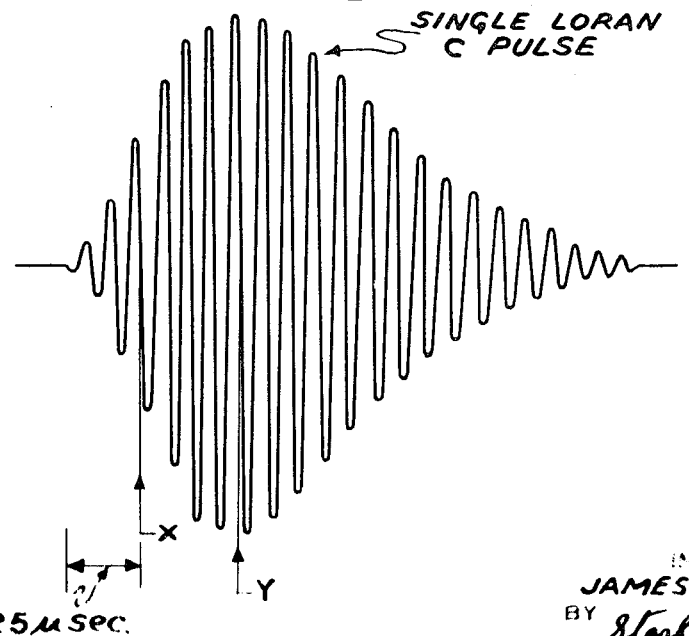
FIG. 2, shows a single Loran C pulse.
Figure 3A:
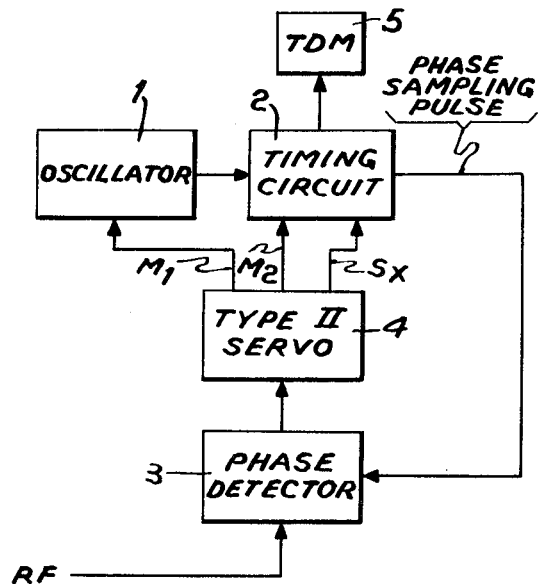
FIGS. 3a and 3b, shows a block diagram of conventional Tracking Loop circuits.

The typical Tracking Loop used in conventional Loran C systems is shown in FIG. 3a, wherein the oscillator 1 generates a 10 megahertz signal, the oscillator output is fed into timing circuit 2, which divides down the frequency of the generated signal and produces a phase sampling pulse which is fed into phase detector 3. The phase sampling pulse is delayed approximately 25 microseconds from the start of each received RF signal pulse and has a frequency of approximately 1 KC so as to provide a sampling pulse for each RF signal pulse in a group received from the Master and Slave transmitters. The RF signal is fed into detector 3 and is sampled for the duration of the phase sampling pulse. The phase detector circuitry can be any ordinary chopper amplifier or comparator circuit as described in "Transistor Circuit Design," Copyright 1963 by Texas Instruments, Inc., wherein the phase detector is attempting to detect a null or crossover in on the negative going portion of the third cycle (uncontaminated portion) of each RF pulse signal as shown in FIG. 2. If the phase detector when activated by the sampling pulse does not detect a null or a crossover point, it then feeds an error signal into Type II servo 4. The Type II servo 4, is a zero velocity error servomechanism with an open loop transfer characteristic of the form $$C/E = KA (\tau S + 1)/S^2$$

Figure 1:
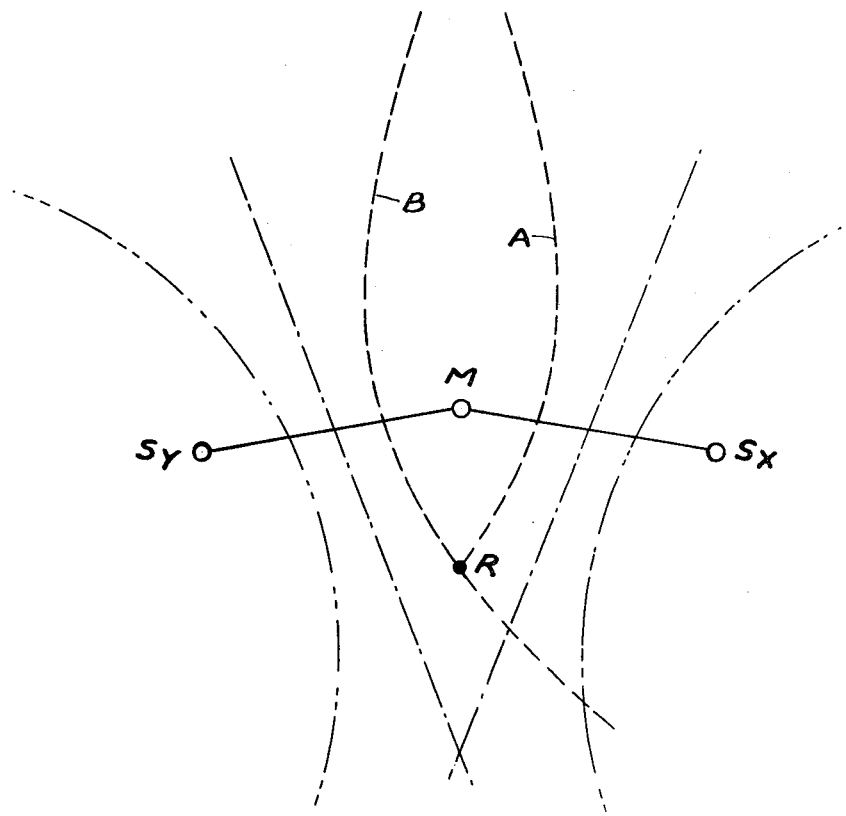
FIG. 1, shows the intersection of hyperbolic lines of position with respect to Master station, Slave X and Slave Y stations.

The terms of the above equation and further explanation of the design criteria of the Type II servo can be found in the publication "Microminature Loran C Receiver/Indicator" by R. A. Reilly, IEEE Transactions, Volume AES-2, No. 1., Jan., 1966, Pages 74–88. The error signal associated with the received Master signal pulse is fed into the Type II servo, and a portion $M_1$ is routed into oscillator 1 to adjust the frequency of the oscillator with respect to the frequency of the Master signal pulse. Another portion $M_2$ of the Processed Master error signal, and the Processed Slave error signal Sx associated with the Slave X transmitter is routed into the timing circuit 2 to adjust the delay in the phase sampling pulse so that when the phase sampling pulse is fed back to the phase detector 3, the activated phase detector 3 detects a null or crossover at X as shown in FIG. 2. When the tracking loop fully adjusts and nulls out all error signals within the loop, a time distance measurement (TDM)5 is produced by timing circuit 2. This time distance measurement records the time delay between the received Master signal and the received Slave X signal, thereby determining one of the locus of points of hyperbola A as shown in FIG. 1. Similar Tracking Loop circuitry for receiving the Slave Y signal with respect to the Master signal will produce the second hyperbola B which will intersect the first hyperbola at R where the mobile receiver is located as shown in FIG. 1.

Figure 3B:
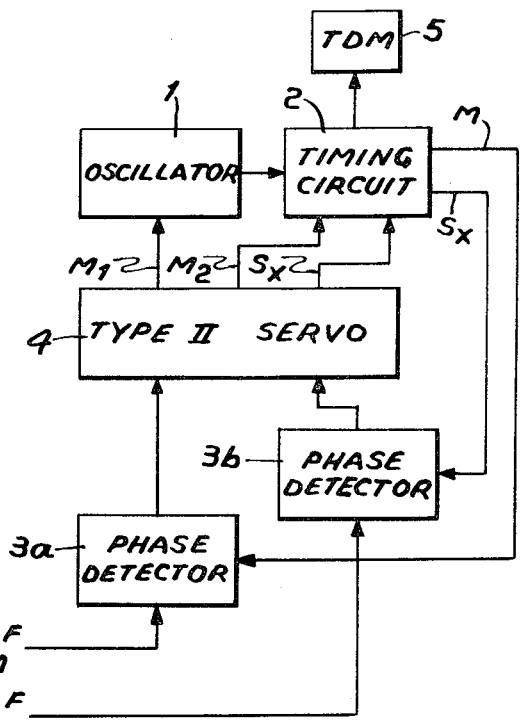

FIG. 3b, shows the separate routing of the RF Master and RF Slave signals into respective phase detectors 3a and 3b, wherein the separately detected Master and Slave X error signals are separately routed into the Type II servo. The Master, and Slave X error signals are separately routed into timing circuit 2, so as to individually adjust the delay of separate phase sampling pulses M and Sx to be used to activate respective phase detectors 3a and 3b. However, current techniques are available to provide for time sharing, so that only one phase detector need be physically provided.

Figure 4:
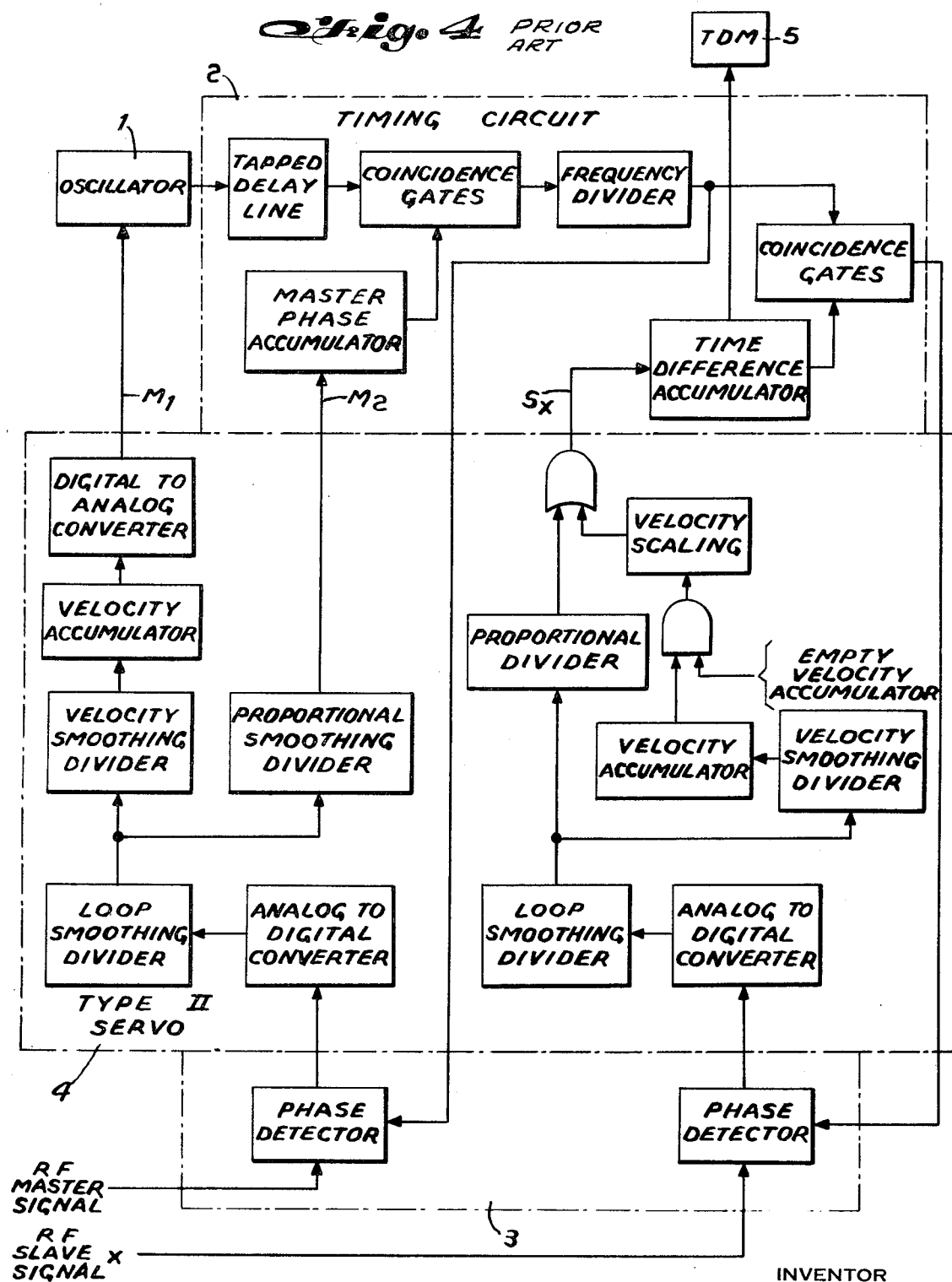

The more detailed block diagram description of FIG. 3b is shown in FIG. 4. FIG. 4 is actually composite block diagram of the respective slave Tracking Loop and Master Tracking loop as shown in FIGS. 10a, and 10b on Page 80 of the above referred to IEEE article by Robert A. Reilly, wherein the frequency divider output in FIG. 10b is fed directly into the coincidence gates of FIG. 10a. The actual design criteria for and explanation of operation of the individual circuit blocks is fully explained in the above referred to IEEE article by R.A. Reilly. (The loop smoothing divider, velocity smoothing divider, proportion divider, proportional smoothing divider, and velocity scaling circuit blocks can be designed using appropriate counter circuits as described in "Pulse, Digital and Switching Waveforms," by Millman & Taub, Copyright 1965 by Mc Graw Hill, Inc., and the velocity accumulator and master phase accumulator circuit blocks can be designed using standard storage flip flop circuits.)

Figure 5B:
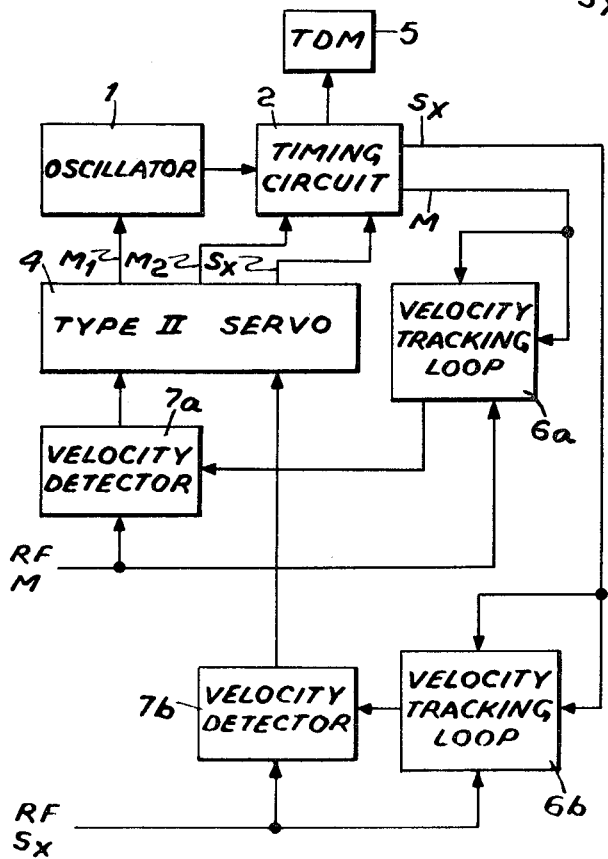
FIGS. 5a and 5b show a block diagram of the basic embodiment of the invention as disclosed.
Figure 5A:
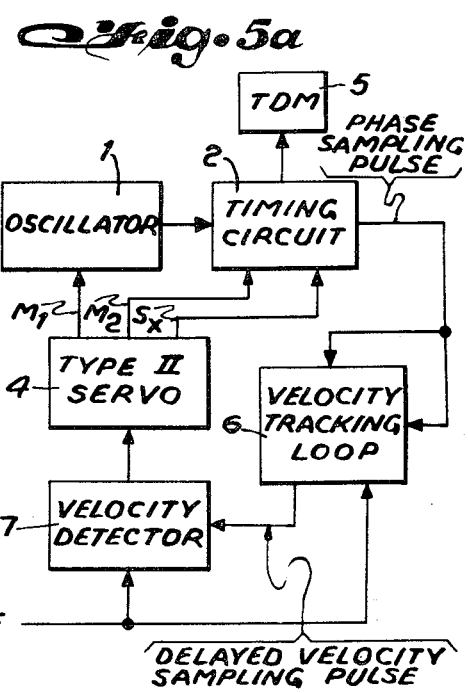

FIG. 5a is a modified form of FIG. 3a, according to the invention, wherein a velocity tracking loop 6 has been placed in the path of the phase sampling pulses on route to the detector circuits now referred to as a velocity detector 7. The velocity detector 7 is actually still the same internal circuit arrangement (standard chopper amplifier circuits) as phase detector 3, the difference being that the sampling pulse introduced into the velocity detector has been additionally delayed to sample the RF signal at or near its peak value. Thus, that portion of the RF signal that may have been contaminated by the skywave signal is sampled in the velocity detector 7, whereas the phase sampling pulse applied to phase detector 3 results in sampling the uncontaminated portion of the RF signal.

In FIG. 5b, separate velocity detectors 7a and 7b, velocity tracking loops 6a and 6b are used for processing RF signals received from the respective Master and Slave X transmitting stations. The operation and performance of oscillator 1 and timing circuit 2 and Type II servo 4, are the same as previously described with reference to FIGS. 3a, 3b and 4, with the exception that the AND gate in the Slave servo loop located between the velocity accumulator and velocity scaler in FIG. 4 may be eliminated from the inventive embodiments shown in FIGS. 5a, 5b, 6, and 7.

Figure 6:
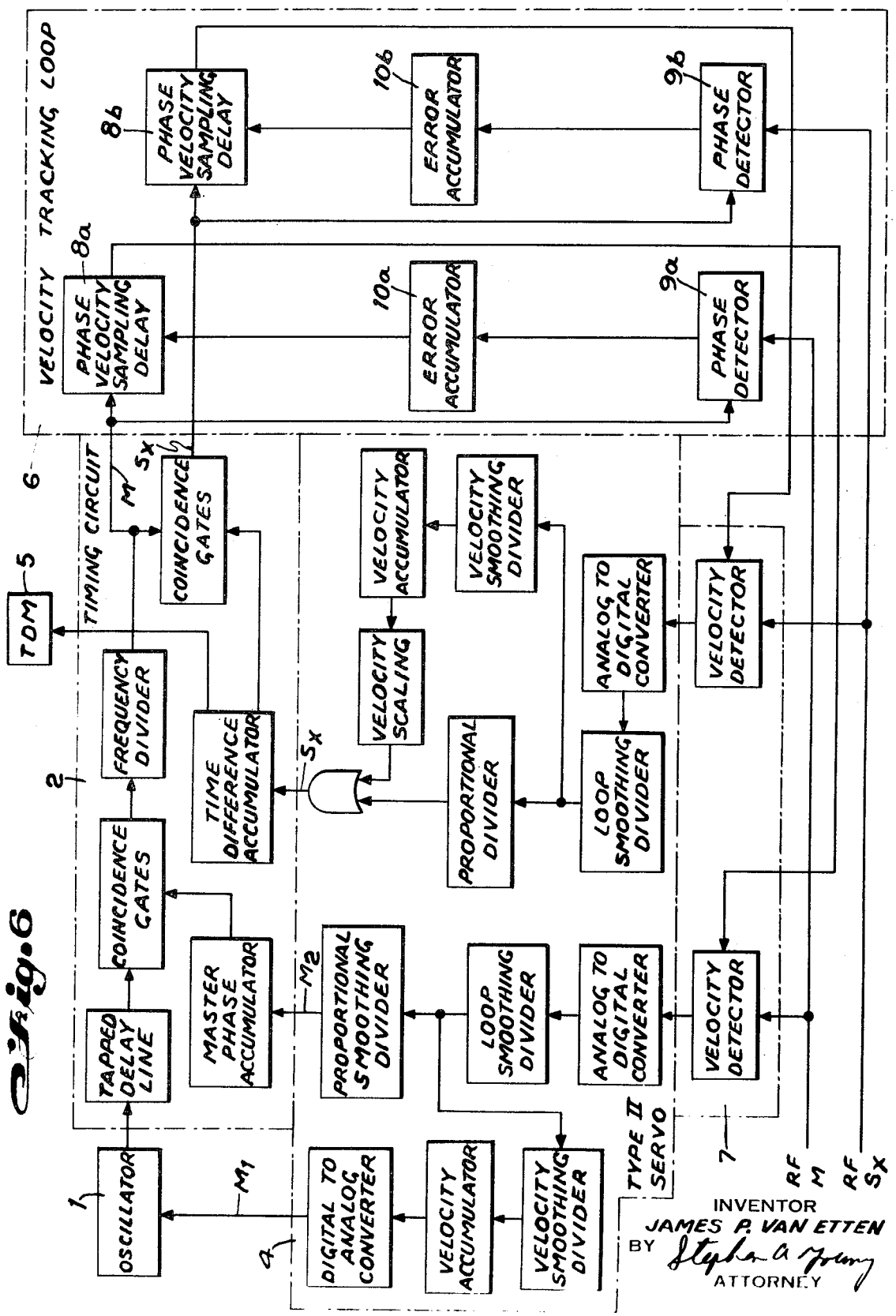
FIG. 6, is a more detailed block description of FIG. 5b.

The velocity tracking loop in FIG. 6 shows a more detailed representation of internal circuit blocks of the velocity tracking loop 6 to carry out the inventive step. The master phase sampling pulse produced by timing circuit 2 is exactly the same as the Master phase sampling pulses produced by conventional tracking loop circuits of FIGS. 3a, 3b and 4, wherein the sampling pulse is delayed 25 microseconds from the start of the received RF Master signal. The Master phase sampling pulse is simultaneously introduced into the velocity tracking loop at the Phase Velocity Sampling Delay block 8a and phase detector 9a. The RF Master signal is also fed into phase detector 9a and is sampled at the uncontaminated portion of the Master signal by the Master phase sampling pulse. The phase detector circuit blocks 9a and 9b can be similarly designed with reference to previously referred to standard chopper amplifier circuits. The RF Master signal is sampled at the phase detector 9a, in order to establish a stable reference point at the null or crossover point of the negative going third cycle of the Master pulse as previously shown in FIG. 2. The error signal detected, if a null is not detected, is fed into error accumulator 10a, which may simply be a capacitor which is accumulating an analog voltage. The error signal from error accumulator 10a is then fed into the phase velocity sampling delay circuit block 8a. This phase velocity sampling delay block 8a may be a typical analog phantastron circuit as described in "Wave Generation and Shaping" by Strauss, Copyright 1960, by Mc Graw Hill, Inc., or may be digital variable delay. This circuit will generally delay the master phase sampling pulse approximately 97 to 113 microseconds from the start of the received master pulse, or in effect, an additional 72 to 88 microseconds in addition to the 25 microsecond delay of the Master phase sampling pulse. The variation in delay of the delayed phase velocity sampling pulse is controlled by the error signal stored in the error accumulator 10a, so that the final phase velocity sampling delay will be referenced to the stable crossover or null point (same as sampling point X as shown in FIG. 2) of RF Master signal detected by the phase sampling pulse produced from timing circuit 2. The delayed phase velocity sampling pulse produced by phase velocity sampling delay 8a, is then fed back to velocity detector 7a to sample the contaminated portion of the RF Master signal at a null or crossover point at or near its peak value (at point Y as shown in FIG. 2). If a null is not detected, an error signal is fed into the analog to digital converter of the Type II servo, wherein the oscillator frequency and master phase sampling pulse produced by the timing circuit 2 are so adjusted as to ultimately assure that the delayed phase velocity sampling pulse will sample the received RF Master signal at a null or crossover point at or near the peak value of the received pulse as shown at Y in FIG. 2. Identical circuit blocks phase velocity sampling delay 8b, error accumulator 10b, and phase detector 9b, are provided within velocity tracking loop 6 to perform the identical closed-loop function for the Slave X phase sampling pulse (Sx) and received RF Slave X signal. After nulls are detected at the outputs of velocity detectors 7a, 7b, and phase detectors 9a and 9b, the Type II servo in conjunction with the timing circuits will produce a time distance measurement at (TDM)5 from the time difference accumulator, which measurement establishes one of the hyperbolic lines (hyperbola A as shown in FIG. 1) necessary to determine the navigation position of the mobile receiver.

FIG. 7 shows an additional loop for receiving the RF signal from the Slave Y transmitter which operates the same as the tracking loop for Slave X and contains velocity detector 7c, phase velocity sampling delay 8c, phase detector 9c and error accumulator 10c including corresponding Type II servo components and timing circuit components used in the Slave X Tracking Loop portion of FIG. 6. Time Distance Measurement (TDM$_2$)11 establishes the hyperbola B as shown in FIG. 1, which intersects hyperbola A to determine the precise location of mobile receiver R.

Since the velocity detectors 7a, 7b and 7c are now detecting the incoming RF Master, Slave X and Slave Y signals at or near 100 percent of peak value, rather than as previous at the point 25 microseconds after start of the received pulses, the signal to noise ratio is at least four times greater and the tracking loop bandwidth may be 16 times greater than previously for the same noise fluctuation. With a servo bandwidth 16 times greater, the errors due to vehicle acceleration are reduced by a factor of 256.

It is to be understood that the foregoing description of the specification is given by way of example only and is not to be considered as a limitation on its scope.

I claim:

1. A method improving the dynamic performance of a tracking loop for use in a pulse navigation radio receiver, said receiver receiving a signal having a contaminated and an uncontaminated portion, comprising the steps of:
    sampling said uncontaminated portion to establish a stable reference point for determining navigation position;
    sampling the contaminated portion of said signal at a point in time determined with respect to said stable reference point;
    utilizing said sampled contaminated portion to correct the navigation position error due to dynamic shifts in the location of said receiver.

2. A method according to claim 1, wherein said contaminated portion is sampled at or near the peak of said received signal, so as to increase the signal to noise ratio of that portion of the signal used for correcting the error in the navigation position due to dynamic shifts in the location of said receiver.

3. A method according to claim 2, wherein the sampling of said contaminated portion further includes the steps of:
    providing a periodic sampling pulse for sampling the uncontaminated portion of said signal;
    delaying said sampling pulse; and
    adjusting the duration of said delay by using the uncontaminated portion of said sampled signal as a reference signal, wherein said adjusted delayed sampling pulse is applied to said signal, so as to sample the contaminated portion at or near peak voltage value of said received signal to provide a velocity error correcting signal that adjusts for errors in position due to dynamic movement of said receiver.

4. A tracking loop having improved dynamic performance for use in a pulse navigation mobile radio receiver including means for sampling an RF signal, said signal having a contaminated and uncontaminated portion, a Type II servo coupled to said sampled signal, an oscillator coupled to said servo, a timing circuit coupled to said oscillator and to said servo, wherein the improvement comprises:

a velocity tracking loop coupled to said timing circuit and said RF signal for delivering a sampling pulse to said sampling means, said velocity tracking loop comprising:

a phase detector coupled to said RF signal, said detector being further coupled to said timing circuit, said timing circuit producing sampling pulses whereby said sampling pulses activate said phase detector so that the uncontaminated portion of said signal is sampled to establish a stable reference point for determining navigation position;

an error accumulator coupled to said phase detector for storing the sampled signal from said phase detector; and means coupled to said timing circuit for delaying said sampling pulses, said delaying means being coupled to said error accumulator in order to alter the delay for said sampling pulses with respect to said stable reference point, said delayed pulses being coupled to said sampling means, whereby said delayed pulses activate said sampling means so that the contaminated portion of said signal is sampled and utilized to correct for navigation position error due to dynamic shifts in the location of said receiver.

* * * * *